Patented Feb. 15, 1949

2,462,046

UNITED STATES PATENT OFFICE 2,462,046

RESINOUS ESTERS OF HIGHER FATTY ACIDS WITH PENTAERYTHRITOLS AND THE METHOD OF MAKING

Joseph A. Wyler, Allentown, Pa., assignor to Trojan Powder Company, Allentown, Pa.

No Drawing. Application January 13, 1945, Serial No. 572,746

4 Claims. (Cl. 260—22)

This invention relates to resinous esters of higher fatty acids with pentaerythritols and the method of making them. More particularly the invention relates to such esters suitable for use in making wrinkle finishes.

Pentaerythritols such as monopentaerythritol $(C(CH_2OH)_4)$, dipentaerythritol

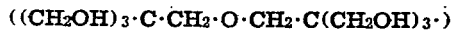

and other polypentaerythritols have been converted to resins by esterification or condensation with both saturated and unsaturated polybasic acids and with saturated and unsaturated monocarboxylic acids of many types and descriptions, to obtain resins useful in making protective and decorative coating compositions in general. However, of these many resins only a few are capable of producing coatings of the "wrinkle" finish type, and these are based upon the use of China-wood oil, with or without a catalyst such as cobalt resinate, maganese resinate, lead resinate, etc., or mixtures of China-wood oil fatty acids with other acids, and these mixtures used to esterify certain polyhydroxy alcohols.

I have discovered that it is possible to produce resins, containing no China-wood oil, by reacting certain pentaerythritols, in the presence of sulfur dioxide $(SO_2)$, with certain unsaturated fatty acids, which resins are capable of producing excellent films of the "wrinkle finish" type.

I have discovered that if certain polyhydroxy materials are caused to react with long chained vegetable oil fatty acids, whose corresponding vegetable oil has a diene number of less than about 4, at elevated temperatures, in the presence of an atmosphere of $SO_2$, that the resins produced are particularly useful for the preparation of "wrinke-finish" coatings.

An object of my invention is to produce resins useful in the preparation of durable, "wrinkle" finishes. A more specific object is to produce resins useful in the preparation of "wrinkle-finish" films having peculiarly pleasant light transmission and reflectance. Another object is to provide resins particularly useful in the manufacture of novelties, lamp shades, window shades, sash decorations, mirror designs, soap wrappers, and the like. Other and further objects will become apparent upon a perusal of this specification and claims.

In order to more clearly point out my invention the following examples, in which all parts are by weight, are given by way of illustration.

*Example #1*

17.9 parts of pentaerythritol of melting point of 258+° C., 52.8 parts of soya bean fatty acids and 27.0 parts of phthalic anhydride were heated in a suitable container provided with a stirrer and a delivery tube for passing $SO_2$ through the liquid reaction mass. The stirred mixture was heated up to 220° C. within 45 minutes and the main reaction was carried out within the temperature range of 220°–230° C. A total of 4 hours were required to complete the esterification to an acid number of 7.8 for the final product. $SO_2$ was passed through the mixture for the whole reaction period. The resulting resin was dissolved in toluene to a 50% solution and then poured on glass plates. It dried readily to a clear film possessing a "wrinkle" finish of exceptional brilliancy and attractiveness.

The proportion of carboxyl groups in the acids used is substantially equivalent to the hydroxy groups of the pentaerythritol.

*Example #2*

Using linseed oil fatty acids and pentaerythritol in the proportion of one mole of pentaerythritol to four of linseed oil fatty acids and carrying out the esterification under the influence of $SO_2$ in the same manner as in Example #1 gave a product of the same general "wrinkle" forming characteristics, except that the film was not as hard as that of Example #1.

A duplicate of Example #1 was run, except that carbon dioxide $(CO_2)$ instead of $SO_2$ was passed through the reaction mass. In this case no "wrinkle" forming characteristics could be detected for the reaction product, indicating that $SO_2$ performs a different function than the $CO_2$. The films made from this resin were clear and smooth.

Using 21.3 parts of dipentaerythritol, 56.4 parts of linseed oil fatty acids and 22.3 parts of phthalic anhydride together with the $SO_2$ as in Example #1 gave no "wrinkle" forming resin.

This is a surprising result and although dipentaerythritol was reacted under various conditions, each experiment failed to give a product capable of forming a "wrinkle" finish.

Glycerine also failed to produce a product capable of forming a "wrinkle" finish.

*Example #3*

Using 22.9 parts of tripentaerythritol, 55.2 parts of linseed oil fatty acids and 21.9 parts of phthalic anhydride together with $SO_2$ in the same manner as in Example #1 gave a product of the same general "wrinkle" forming characteristics as that of Example #1.

Using $CO_2$ instead of $SO_2$ gave a product which had no "wrinkle" forming characteristics.

*Example #4*

Using 43.2 parts of "mother liquor," 52.8 parts of soya bean oil fatty acids and 27.0 parts of phthalic anhydride together with $SO_2$, in the same manner as in Example #1 gave a product of the same general "wrinkle" forming characteristics as that of Example #1, and of maximum hardness.

Using $CO_2$ instead of $SO_2$ gave a product which had no "wrinkle" forming characteristics.

The term "mother liquor" as used in this application is intended to cover the syrupy organic product formed in the usual commercial process for the preparation of pentaerythritol by the condensation of $CH_2O$ and $CH_3CHO$ in alkaline media, and which remains in the final mother liquor after the removal of most of the pentaerythritol, polypentaerythritols, formic acid and mineral salts originally contained therein. This final mother liquor upon evaporation yields a substantially dry, viscous, somewhat colored, syrupy, polyhydroxy material which is known as "mother liquor."

The resins made from "mother liquor" have excellent hardness characteristics, being better in this respect than pentaerythritol, which itself is considered to be an excellent material for this purpose.

As indicated above, not all polyhydric alcohols may be used in my process. I have found that pentaerythritol, tripentaerythritol and "mother liquor" may be used and that dipentaerythritol, glycerine, and others are inoperative.

In the examples, I have mentioned linseed and soya bean oil fatty acids. However, I may use in place of these any long-chained, vegetable oil fatty acids whose vegetable oil has a diene No. of less than about 4. These fatty acids are obtainable from the vegetable oils by hydrolysis. Also, I have shown the use of phthalic anhydride in conjunction with linseed oil. I may, similarly use other polybasic aromatic carboxylic acids or anhydrides in admixture with the vegetable oil fatty acids mentioned above. In all cases, however, the "wrinkle producing" acid is the vegetable oil fatty acid. The saturated aromatic polycarboxylic acid is a conditioning agent, that is, it modifies the nature of the wrinkle finish from the standpoint of hardness, rate of drying, etc., but does not produce the "wrinkle." The amounts of these aromatic polycarboxylic acids used in a given mixture are dependent upon the nature of the wrinkle finish desired. When a hard, quick drying wrinkle is desired more of these polybasic acids is added than when a more flexible product is to be made. If too much is added, the wrinkle finish is destroyed and a plain, smooth, clear film results. In short I use only a "conditioning amount" of the polybasic acid in any given resin. In terms of actual proportions, a "conditioning amount" is less than about one half the weight of the fatty acids used in a given reaction. Examples of the aromatic polycarboxylic acids and anhydrides which I may use are phthalic acid, isophthalic acid, terephthalic acid, naphthalic acid, hemimellitic acid, etc. and their anhydrides.

The examples given above are merely illustrative of my invention. I may use various proportions of the vegetable oil fatty acids to the polyhydroxy alcohols; I may use temperatures as high as about 300° C., but I prefer a temperature range of about 220 to about 230° C. for the main portion of the reaction; I may carry out the esterification to an acid number of less than 7 but in general I prefer to have an acid number of more than 7, preferably about 25. In short, I may carry out the esterification with any of the modifications that would occur to a person skilled in this art, without departing from the essence of my invention.

I claim:

1. The process of preparing a synthetic resinous material which, when applied as a coating film, gives a wrinkled finish, the process comprising heating in an atmosphere of sulfur dioxide a mixture of fatty acids selected from the group consisting of the fatty acids of linseed oil and the fatty acids of soya bean oil, a condensing agent selected from the group consisting of aromatic polycarboxylic acids and their anhydrides, and a polyhydric alcohol selected from the group consisting of pentaerythritol, tripentaerythritol and the syrupy organic polyhydroxy product resulting from preparing pentaerythritol by condensing formaldehyde and acetaldehyde in alkaline media and then removing from the reaction products most of the pentaerythritol, polypentaerythritols, formic acid and mineral salts originally present therein and continuing the heating of said mixture at the temperature of esterification of the polyhydric alcohol and the fatty acids until the reaction is substantially complete, the proportion of the said condensing agent by weight being less than half the proportion of the fatty acids and the proportion of carboxy groups in the acids used being substantially equivalent to the hydroxyl groups of the polyhydric alcohol.

2. A composition of matter which, when applied as a coating film, gives a wrinkled finish, the composition consisting of the mixed ester of a condensing agent selected from the group consisting of aromatic polycarboxylic acids and their anhydrides, fatty acids selected from the group consisting of the fatty acids of linseed oil and the fatty acids of soya bean oil and a polyhydric alcohol selected from the group consisting of pentaerythritol, tripentaerythritol and the syrupy organic polyhydroxy product resulting from preparing pentaerythritol by condensing formaldehyde and acetaldehyde in alkaline media and then removing from the reaction products most of the pentaerythritol, polypentaerythritols, formic acid and mineral salts originally present therein, the proportion of the said condensing agent represented in the ester being less than half the proportion of the fatty acids, the proportion of carboxy groups in the acids used being substantially equivalent to the hydroxyl groups of the polyhydric alcohol and the ester being made as described in claim 1.

3. A composition of matter which, when applied as a coating film, gives a wrinkled finish, the composition consisting of the mixed ester of phthalic anhydride, linseed oil fatty acids, and pentaerythritol, the proportion of the phthalic anhydride represented in the ester being less than half the proportion of the linseed oil fatty acids, and the composition being made by the process described in claim 1.

4. The process described in claim 1, the said fatty acids being linseed oil fatty acids and the temperature of the said heating being 220° to 300° C.

JOSEPH A. WYLER.

(References on following page)

REFERENCES CITED

The following references are of record in the file of this patent:

UNITED STATES PATENTS

| Number | Name | Date |
|---|---|---|
| 1,667,189 | Burke et. al. | Apr. 24, 1928 |
| 1,970,510 | Ellis | Aug. 14, 1934 |
| 2,348,708 | Bradley | May 16, 1944 |

OTHER REFERENCES

Garner, Jour. Soc. Chem. Ind., vol. 47, pp. 278–80 T (1928).

Ser. No. 359,978, Waterman et. al (A. P. C.), published June 15, 1943.